United States Patent [19]
Smith

[11] 3,894,758
[45] July 15, 1975

[54] VACUUM HOSE RETAINER

[75] Inventor: Radley M. Smith, Ann Arbor, Mich.

[73] Assignee: Ford Motor Company, Dearborn, Mich.

[22] Filed: Nov. 26, 1973

[21] Appl. No.: 419,176

[52] U.S. Cl............................ 285/305; 285/340
[51] Int. Cl.² ................................. F16L 37/00
[58] Field of Search ...... 285/340, DIG. 3, 423, 305, 285/174, 319, 177, 317, 7, 8

[56] References Cited
UNITED STATES PATENTS

| | | | |
|---|---|---|---|
| 3,312,483 | 4/1967 | Leadbetter et al. | 285/340 |
| 3,429,596 | 2/1969 | Marshall | 285/340 |
| 3,645,567 | 2/1972 | Reinker | 285/340 |

FOREIGN PATENTS OR APPLICATIONS

| | | | |
|---|---|---|---|
| 568,304 | 3/1945 | United Kingdom | 285/DIG. 3 |

*Primary Examiner*—Dave W. Arola
*Attorney, Agent, or Firm*—Robert A. Benziger; Keith L. Zerschling

[57] ABSTRACT

A vacuum hose retainer apparatus for providing positive vacuum hose retention and improved assembly ease is disclosed. The vacuum hose retainer is comprised of an interiorly positioned deformable elastomeric material having a central bore extending therethrough. The central bore is sized on one end for an interference fit with a vacuum port and has an oversized section for receipt of the vacuum hose. The vacuum hose is preferably bonded to the interior of the elastomeric or insert member by suitable glues or solvents and is inserted therein in an interference fit condition. The vacuum hose retainer further includes a generally U-shaped metal housing body which is apertured on one end for passage of the vacuum port. This aperture is provided with inwardly directed gripping teeth and is adapted for passage of the vacuum hose through the opposite end.

6 Claims, 3 Drawing Figures

VACUUM HOSE RETAINER

BACKGROUND OF THE INVENTION

1. Field of the Invention

The present invention is directed to the field of apparatus for positively connecting a vacuum hose to a vacuum port. In particular, the present invention is directed to that portion of the above noted field which is concerned with apparatus by which the vacuum hose may be rapidly and conveniently applied to a vacuum port to result in a positive connection between the vacuum hose and the vacuum port. More particularly still, the present invention is directed to that portion of the above noted field which is concerned with such apparatus which may be coupled to the vacuum hose so as to provide rapid and convenient assembly of the vacuum hose to the vacuum port. With greater particularity still, the present invention is directed to that portion of the above noted field which is concerned with vacuum hose retention apparatus which may be added to the vacuum hose to provide an easily assembled positive coupling at low cost.

2. Description of the Prior Art

The presently utilized automatic temperature control apparatus for the heater and air conditioning systems of an automobile relies heavily upon vacuum operated air vent controlling doors to direct the various air flows to provide a blend of air entering the passenger compartment of the automobile which closely approximates the desired temperature. Furthermore, various other accessories of an automobile are operated by vacuum motors or controlled by vacuum actuated controls so that a large number of vacuum connections must be made between the various accessories and the vacuum sources normally present in or provided with the automobile. These vacuum connections are accomplished by taking a relatively flexible vacuum hose or conduit and forcibly applying the hose to a projecting vacuum port so that the vacuum port tubing enters into the passage of the vacuum hose.

It has been brought to my attention that in a significant number of cases, the vacuum hose is applied to the vacuum port in such a manner as to result in a relatively insecure connection such that the associated vacuum operated equipment may operate once or twice during a test mode but may be subsequently rendered inoperative due to the vacuum hose becoming uncoupled from the vacuum port. In other instances, the connection is sufficiently loose that the vibration of operation of the internal combustion engine or subsequent assembly operations which involve contact with the vacuum hose will result in the vacuum hose becoming disassociated from the vacuum port. These failures result in the vehicle failing to pass the quality control tests to which the vehicles are subjected at the end of the manufacturing line, or by the dealer prior to delivery to the customer. These failures result in a time consuming and sometimes exhaustive analysis of the vehicle to determine the point of failure. Furthermore, many of the vacuum ports are located at locations throughout the vehicle which are relatively inaccessible after the vehicle has been fully assembled due to the inclusion of components which are not present when the acutal vacuum hose to vacuum port connection is made. It is therefore a specific object of the present invention to provide apparatus for addition to the vacuum hose which will facilitate the application of the vacuum hose to the vacuum ports to provide for a positive connection between the vacuum hose and the vacuum ports with a high degree of reliability.

While the prior art of hose couplings and joints discloses a large number of devices which may be used to accomplish the broad objectives of the present invention, that is, apparatus for positively connecting a hose to a vacuum port, a large number of the prior art solutions to the general problem would require assembly techniques other than those currently utilized, for example threaded connections, so it is therefore a specific object of the present invention to provide a vacuum hose retainer apparatus which will provide a positive connection between the vacuum hose and vacuum port with a high degree of reliability in a push-on type connector. The prior art discloses a substantial number of different push-on connector configurations which would again satisfy the broad objectives of the present invention however these push-on connectors generally involve complicated metal configurations which would be required either for the vacuum port itself or for additional associated structure to be added to the vacuum hose. These configurations would be relatively expensive to fabricate and/or to assemble to the vacuum hose and which would present a potential hazard to an assembler in performing the push-on connection since many of the shapes involve sharp edges or corners. It is therefore a specific object of the present invention to provide relative uncomplicated apparatus for addition to a vacuum hose which will provide for positive vacuum hose coupling to a vacuum port and which is susceptible of push-on assembly of the vacuum hose to the vacuum port. It is a still further objective of the present invention to provide such apparatus which is inexpensive to fabricate and assemble and which does not present sharp edges or corners to an assembler.

Other prior art couplings which accomplish the general objectives set forth hereinabove are not readily susceptible of push-on assembly techniques since some initial stretching of an elastomeric member is required to introduce the vacuum port into the vacuum hose passage. It is therefore a further object of the present invention to provide a retention apparatus for additon to a vacuum hose which apparatus provides for convenient and accurate guidance of the vacuum port into the vacuum hose passage whereby rapid push-on of the retainer to the vacuum port will provide an adequate coupling. Still other prior art solutions to the general problem of positive retention of a vacuum hose by a vacuum port have relied upon connections between for example O-rings and specially provided contours on the vacuum hose. Inasmuch as these specially provided contours increase the expense of the vacuum hose and defeat the use of standard tubing cut to various lengths without special treatment, it is a further object of the present invention to provide a positive vacuum hose retention apparatus which may be used in conjunction with standard vacuum hosing which does not require special and treatment to alter its configuration. It is also a specific object of the present invention to provide apparatus which may be added to the end of a relatively flexible vacuum hose member which may provide additional stiffness and reduced resiliency for the vacuum hose member in the axial direction and which also provide ramp guide means to direct a vacuum port toward the axial center of the vacuum hose.

SUMMARY OF THE PRESENT INVENTION

The present invention provides a vacuum hose retention apparatus in the form of an inner resilient coupling member which may be suitably bonded to the vacuum hose and a metallic outer member arranged in generally surrounding relationship with respect to the inner member and having an aperture for receipt of the vacuum port. The metallic outer member is provided with surfaces defining a guidance ramp means which will guide the vacuum port so that it will be axially centered with respect to the vacuum hose in its retention position within the inner member. The guidance ramp means are further provided with gripping surfaces which are cooperative, as a result of the angulation of the ramp and the normal resiliency of the metal member, to provide for a positive gripping in the event of application of a removal force to the vacuum hose or the vacuum hose retention apparatus. The resilient inner member is provided with a bore which extends therethrough and which is apertured on one end to receive the vacuum hose in a close fit relationship and is apertured at the other end to provide an inwardly directed conical surface to further assist in guiding the vacuum port axially into the vacuum hose. The metallic outer member is provided with a generally U-shaped configuration which is open at one end for receipt of the vacuum hose member. The vacuum hose may be relatively permanently retained within the inner member through the use of suitable glues or solvents which cause the material of the vacuum hose to bond to the material of the inner member when the vacuum hose is inserted into the inner member or alternatively the present invention may rely upon a press fit relationship and the combined resilient actions of the vacuum hose member, the inner member, and generally U-shaped outer member when coupled to a vacuum port.

DETAILED DESCRIPTION OF THE PREFERRED EMBODIMENT

Figure 1:
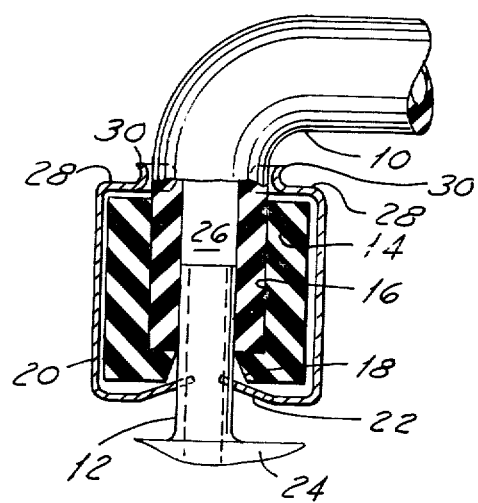
FIG. 1 illustrates, in a sectional view, the present invention in cooperative assoication with a vacuum hose and a vacuum port illustrating the operation of the present invention.

Referring now to the drawing wherein like numerals designate like structure throughout the various views thereof, FIG. 1 illustrates the present invention in a sectional view in cooperative association with a vacuum hose 10 and a vacuum port 12. As here illustrated, the vacuum hose 10 is of a generally axially flexible rubber or plastic material having relatively thick wall portions. This material is normally found to be quite flexible in the axial direction but to be otherwise relatively rigid and to resist stretching or compressing. By way of example, a typical vacuum hose may have a wall thickness of 0.150 inches and a central passage diameter of 0.100 in. and be formed of polyvinylchloride or rubber. According to the present invention, a resilient inner or insert member 14 is provided with a bore which extends therethrough. Insert member 14 may be formed of an elastomeric material and may be relatively rigid with respect to the vacuum hose tubing material. The central bore of inner member 14 is comprised of a first portion 16 and a second portion 18. The first portion 16 is generally cylindrical and is sized to be no larger in diameter than the vacuum hose 10, preferably the diameters are approximately equal. First portion 16 has a length which extends for a major distance through the inner or insert member 14. Second portion 18 is a relatively shorter portion which is coaxial with the first portion 16 and which is provided with a conical or ramp surface. The conical surface of second portion 18 is convergent toward the interior region of insert member 14. As stated hereinabove, the inner or insert member 14 may be advantageously formed of an elastomeric material. The material selected should be compatible with the material of the vacuum hose 10 and use of the same type of material as the vacuum hose 10 for the inner or insert member 14 is recommended. The diameter of first passage portion 16 should be not greater than the outer diameter of the vacuum hose 10 so that bonding therebetween will be assured. Second portion 18 is convergent to an aperture approximately equal to the passage of vacuum hose 10.

The present invention also provides for a metallic outer, or exterior, generally U-shaped housing member 20 which is situated to be in generally surrounding relationship with respect to the inner or insert member 14. Outer member 20 is provided with a pair of inwardly directed guide members 22 which extend from the bottom of outer member 20 (relative to FIG. 1) toward the interior of the inner member or insert member 14 to define a first aperture. As here shown, outer or exterior member 20 may be conveniently formed by a single stamping operation from a strip of suitable material such as steel strap. According to FIG. 1, vacuum port 12 appears as a short length of hollow conduit or pipe which extends from a body 24 and which is to be inserted, and is so shown, into the interior region 26 of vacuum hose 10.

Figure 2:
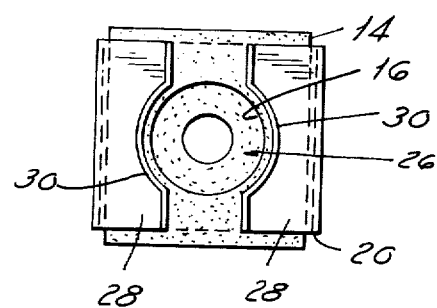
FIG. 2 is a top elevational view of the apparatus of the present invention in assembled relationship.

Referring now to FIGS. 1 and 2, and particularly to FIG. 2, the vacuum hose retention means of the present invention is illustrated in a top elevational view which indicates the interrelationship between the bore which extends through inner or insert member 14 and outer member 20. Outer member 20 is provided with a pair of transversely extending arm portions 28 which extend across the top of the inner or insert member 14 (again relative to FIG. 1). Each of the arm members 28 is provided with an upstanding contoured section 30 which is arranged to surround vacuum hose 10 and to avoid any sharp edges which could cut or puncture the vacuum hose 10 and which define a second aperture disposed opposite to the first aperture.

Figure 3:
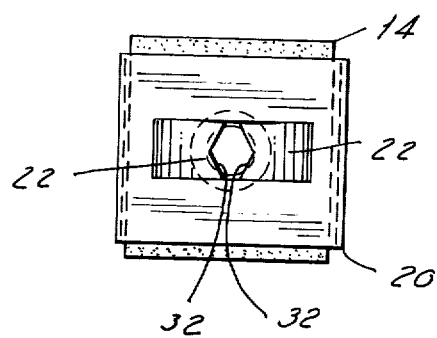
FIG. 3 is a bottom elevational view of the apparatus of the present invention in assembled relationship.

Referring now to FIG. 3, the vacuum hose retention apparatus of the present invention is illustrated in a bottom elevational view which shows the configuration of the guidance means 22. Each of the guidance means 22 is provided with a V-shaped end portion 32. The V-shaped end portions 32 are arranged to be in confronting relationship and to be approximately centered with resect to the axial center line of the bore portions 16 and 18 when the retention means are in assembled relationship so as to be capable of being so centered when pushed on to a vacuum port. The inwardly directed guidance means 22 cooperate with the conical surface of second portion 18 to loosely position the insert member 14 and the housing member 20 for receipt of the vacuum port 12.

The present invention according to FIGS. 1, 2 and 3, is thus capable of operation as follows. The inner portion 14 and the outer portion 20 may be loosely assembled by merely inserting portion 14 within portion 20 such that the conical surface of the small second bore portion 18 is in proximity to the guidance members 22. The conical surface and the inwardly projecting guidance means cooperate to approximately properly position the inner or insert member 14 with respect to the outer portion or housing 20. A suitable solvent or glue may be applied to the end portion of the vacuum hose 10 to facilitate its entry into the first bore portion 16 so that it may subsequently become bonded to the inner member 14. The vacuum hose 10 and inner or insert member 14 may thus function and appear to be of substantially unitary construction. Vacuum hose 10 may subsequently be assembled to vacuum port 12 by push-on techniques as has been the case in the past. The outer member 20 will cooperate with inner member 14 to provide a convenient gripping arrangement. Guidance means 22, as they are inwardly directed and provide a gap between the V-shaped notches 32 at their confronting ends, will cooperate with the end of the vacuum port 12 to guide the vacuum port 12 into coaxial alignment, firstly with the conical surface of passage portion 18 and secondly with the interior region 26 of the vacuum hose 10. Push-on application pressure will be operative to deform the guidance members 22 to slightly separate their confronting end portions 32 to facilitate assembly.

Guidance means 22 in cooperation with the inwardly convergent conical surface of second passage portion 18 will cooperate to guide the vacuum port 12 into the interior region 26 of the vacuum hose 10 thereby assuring the easy assembly of the vacuum hose to the vacuum port. Furthermore, the inner or insert member 14, extending for a distance along the vacuum hose which is at least of the same order of magnitude as the height of the vacuum port, will provide for an axial stiffening of the end portion of the vacuum hose 10 and for an enlarged gripping surface to assure that the vacuum hose 10 will be suitably pressed onto the vacuum port 12. Furthermore, the presence of the V-shaped notches 32 at the ends of the inwardly directed guidance means will provide for a positive gripping force to strongly grip the surface of the vacuum port 12 to oppose any removal forces, in the same manner as the well known speednut, which may be inadvertently applied to the vacuum hose 10 during further assembly operations.

It can thus be seen that the present invention readily accomplishes its stated objectives. Each of the two pieces of the vacuum hose retention apparatus of this invention is relatively simple and easily manufactured and is a low cost item. The two pieces in assembled relationship with a vacuum hose provide for a convenient and improved gripping surface for hand assembly of the vacuum hose to the vacuum port while further providing for increased axial stiffening of the vacuum hose in the specific region of insertion of the vacuum port. The provision of the inwardly directed guidance members 22 and the inwardly convergent conical surface of passage portion 18 assure that the vacuum port will be axially aligned with the axis of the vacuum hose 10. By providing the V-shaped end portions on each of the inwardly directed guidance members 22, the present invention provides a strong positive resistance to the application of any force which would tend to uncouple the vacuum hose 10 from the vacuum port 12 even in those cases where the vacuum port 12 has only been partially inserted within the vacuum hose 10. By providing the outer member 20 with the arm portions 28 which partially cover the top element of the inner or insert member 14, the assembly of the vacuum hose retention means of this invention to a vacuum hose is facilitated since the outer member may also be applied to the combination of vacuum hose and insert member 14 subsequent to the bonding of the insert member 14 to the vacuum hose 10. Furthermore, by providing the arm portions 28 with an upstanding flange portion 30 which is in generally surrounding relationship to a portion of the vacuum hose 10, a gripping force applied to the side walls of the outer member 20 which would tend to force the arm portions 28 together thereby having the effect of partially closing the vacuum hose 10 immediately above the region 26 to provide further axial stiffening and facilitate push-on assembly. Such compressive force would normally be applied in the process of hand assembly and may overcome the force tending to separate the vacuum hose 10 and insert member 14 generated by push-on assembly. This is particularly important where the coupling between inner member 14 and vacuum hose 10 relies upon an interference fit. The convergent conical surface of second bore portion 18 assures proper axial alignment of the vacuum port 12 with the interior region 26 of vacuum hose 10. The lip 34 provided by the aperture of second portion 18 at the entrance to first portion 16 is operative during push-on assembly to be deformed by upward stretching as the end of the vacuum port 12 approaches lip 34. This operates to spread the mouth of the passage of the vacuum hose 10 to further ease and assure adequate connection between the vacuum port 12 and the vacuum hose 10.

I claim:

1. In combination with a hollow flexible hose for fluid tight communication with a rigid conduit, the improvement comprising:

an insert member coupled to one end of the flexible hose and having an aperture for receipt of the rigid conduit, the aperture having a conical inner surface convergent toward, and coaxial with, the flexible hose; and a housing member having a first aperture aligned with said insert member conduit receiving aperture;

said housing member having a pair of inwardly directed guidance ramp members extending generally toward each other and into the region defined by the conical inner surface of said insert member aperture;

said guidance ramp members having V-shaped notches formed at their confronting ends to define said first aperture, the sides of said V-shaped notches being arranged for engagement with the rigid conduit;

said housing member including arm means positioned on the side of said insert member opposite the rigid conduit aperture loosely surrounding and embracing the flexible hose.

2. The apparatus of claim 1 wherein said arm means comprise means defining a second aperture and include upstanding flange portions for gripping, without puncturing, the flexible hose.

3. The apparatus of claim 1 wherein said guidance ramp members are positioned for loose contactive engagement with the conical surface of the insert member aperture.

4. The apparatus of claim 1 wherein said insert member extends along the flexible hose for a distance of the same order of magnitude as the length of the rigid conduit.

5. The apparatus of claim 1 wherein said guidance ramp members are flexible for permitting easy passage of the rigid conduit in a first insertion direction and, cooperative with the V-shaped notches, to inhibit passage of the rigid conduit in the opposite direction.

6. The apparatus of claim 5 wherein said insert material is selected to be resiliently at least as rigid as the material of the flexible hose.

* * * * *